United States Patent Office 3,213,148
Patented Oct. 19, 1965

3,213,148
CHLOROMETHYLATION
Clarence W. Huffman, Glenview, Ill., assignor to International Minerals & Chemical Corporation, a corporation of New York
No Drawing. Filed Jan. 12, 1961, Ser. No. 82,175
10 Claims. (Cl. 260—651)

This invention relates to the chloromethylation of alkylbenzenes. In one of its aspects, this invention relates to an improvement in the chloromethylation of monoalkylbenzenes. In a preferred aspect, this invention relates to a method wherein monoalkylbenzenes and selected polyalkylbenzenes are concomitantly chloromethylated by reaction thereof with formaldehyde and HCl.

The chloromethylation of hydrocarbon materials has been the subject of numerous literature articles and patents. Chloromethylation commonly is effected by the reaction of a hydrocarbon with hydrochloric acid and formaldehyde (or paraformaldehyde).

From the standpoint of simplicity, the reaction of an alkylbenzene with formaldehyde and hydrochloric acid in the presence of water is most advantageous. Such procedure is described inter alia in "Trimethylbenzene Chlorides and Their Derivatives," Hartough, Industrial and Engineering Chemistry, page 903, May 1950. While the chloromethylation of trialkylbenzenes such as mesitylene proceeds rather rapidly, the chloromethylation of monoalkylbenzene normally proceeds quite slowly and, therefore, has been substantially less attractive.

In view of the long reaction times experienced for the chloromethylation of monoalkylbenzenes, the art has attempted to effect the chloromethylation of these materials employing a catalyst such as zinc chloride and the like. Such procedures, exemplified inter alia by United States Patents Nos. 2,219,873, 2,447,479, 2,525,777, 2,569,803, 2,596,092, 2,676,987, 2,541,408 and 2,859,253, employ formaldehyde, hydrochloric acid, and an alkylbenzene as essential reactants in the presence of a catalyst, normally zinc chloride. The processes may be carried out either in the presence of water or in the absence of water. While the reaction rate is increased by the presence of a catalyst, these processes entail the necessity of removing the catalyst from the final product. Complete removal of the catalyst is necessary, otherwise the product will polymerize during the subsequent distillation.

It is a principal object of this invention to provide an improved method for the chloromethylation of monoalkylbenzenes.

It is another object of this invention to provide a method for chloromethylating alkylbenzenes which is characterized by an increased efficiency.

It is a further object of this invention to provide a method for chloromethylating a mixture of alkylbenzenes which is characterized by a diminished amount of HCl off-gas.

It is an additional object of this invention to provide a method for the chloromethylation of alkylbenzene mixtures containing monoalkylbenzenes wherein chloromethylation of the monoalkylbenzenes proceeds at a more rapid rate than that which is obtained when the monoalkylbenzenes, per se, are chloromethylated.

Further objects of this invention will become apparent from the description which follows.

In accordance with the present invention, the rate of chloromethylation of monoalkylbenzenes by reaction thereof with formaldehyde and HCl is improved by concomitantly chloromethylating a polyalkylbenzene in admixture with said monoalkylbenzene, the mixture undergoing chloromethylation being characterized by (A) containing essentially alkylbenzenes having 8 to 10 carbon atoms in their molecules; (B) containing from about 70% to about 20% by weight monoalkylbenzenes; (C) containing from about 30% to about 80% by weight of the polyalkylbenzenes selected from the group consisting of di-, tri-, and tetraalkylbenzenes; and (D) containing at least about 10% by weight of a polyalkylbenzene having more than 2 alkyl carbons.

In carrying out the process of the present invention there is formed a reaction mixture containing;

(I) A mixture containing essentially only alkylbenzenes having from 8 to 11 carbon atoms in the molecule and characterized by (a) containing from about 70% to about 20% by weight monoalkylbenzene; (b) containing from about 30% to about 80% by weight of a polyalkylbenzene selected from the group consisting of di-, tri-, and tetraalkylbenzene; and (c) containing at least about 10% by weight of a polyalkylbenzene having more than 2 alkyl groups;
(II) Formaldehyde; and
(III) Aqueous HCl.

This mixture is preferably agitated and HCl gas passed therethrough at a temperature of at least about 70° C. to provide a mixture containing monochloromethylalkylbenzenes and bis(chloromethyl)alkylbenzenes. This mixture can be separated, generally after removal of the aqueous phase, by conventional fractionation procedures as, for example, fractional distillation.

The method of this invention, employing a mixture of the more readily chloromethylated polyalkylbenzenes and the less readily chloromethylated monoalkylbenzenes, increases the yield of the chloromethylated monoalkylbenzenes as compared to a comparable process wherein only mono- and/or dialkylbenzenes are treated. Moreover, the presence of the more readily chloromethylated alkylbenzenes enables hydrochloric acid gases to be introduced at a significant rate without any substantial amount of HCl off-gas from the reaction mixture at least during the preliminary portions of the reaction. The method of this invention does not require a catalyst and, therefore, provides a final reaction mixture from which the products readily may be separated. The bis(chloromethyl) material can be separated from the monochloromethyl material without difficulty employing standard distillation procedures.

The present invention contemplates alkylbenzene mixtures wherein the alkylbenzenes are characterized by having from about 8 to about 11 total carbon atoms in their molecule. While mixtures with a number of total carbon atoms varying broadly from 8 to 11 are within the scope of this invention, the starting materials often are obtained as petroleum fractions and frequently are closely refined. Mixtures having a total of 9 to 10 carbon atoms constitute preferred starting materials for the practice of this invention.

As indicated above, the mixture of alkylbenzenes will contain from about 30% to about 80% of the more reactive di-, tri-, and tetraalkylbenzenes and correspondingly from about 70% to about 20% by weight of monoalkylbenzenes. In all events, however, the mixtures will contain at least about 10% of the very reactive tri- and tetraalkylbenzenes.

Preferred materials for the practice of this invention contain from about 50% to about 60% of monoalkylbenzenes, from about 10% to about 40% tri- and tetraalkylbenzenes, and the remainder dialkylbenzenes.

The tri- and tetraalkylbenzenes contemplated by this invention include, without limitation, trimethylbenzene, dimethylethylbenzene, methyldiethylbenzene, dimethylpropylbenzene, tetramethylbenzene, trimethylethylbenzene, and the like.

The dialkylbenzenes contemplated by this invention include, without limitation, methylethylbenzene, methylpropylbenzene, methylbutylbenzene, methylisobutylbenzene, diethylbenzene, ethylpropylbenzene, ethylisopropylbnezene, and the like; and the monoalkylbenzenes include, without limitation, ethylbenzene, propylbenzene, isopropylbenzene, butylbenzene, isobutylbenzene, pentylbenzene, and the like.

Representative hydrocarbon materials which may be processed in accordance with this invention are set forth in Table I below.

TABLE I

|  | Hi-Sol[a] 98F | Hi-Sol 10F | Hi-Sol 15F | AW 2[b] | Panasol RA-21[c] |
|---|---|---|---|---|---|
| Monoalkyl: |  |  |  |  |  |
| Ethylbenzene | 3 |  |  | 1 |  |
| propylbenzene | 44 | 40 |  | 33 |  |
| Butylbenzene | 12 | 16 | 52 | 24 | 31 |
| Total | 59 | 56 | 52 | 58 | 31 |
| Dialkyl: |  |  |  |  |  |
| Methylethylbenzene |  |  |  |  | 22 |
| Diethylbenzene |  |  |  |  |  |
| Propyltoluene | 29 | 5 |  | 6 |  |
| Dipropylbenzene |  |  |  |  |  |
| Total | 29 | 5 |  | 6 | 22 |
| Trialkyl: |  |  |  |  |  |
| Tripropylbenzene |  |  |  |  |  |
| Triethylbenzene |  |  |  |  |  |
| Trimethylbenzene | 11 | 39 |  | 32 | 45 |
| Tetramethylbenzene |  |  | 46? |  |  |
| Total | 11 | 39 | 46? | 32 | 45 |
| Other unidentified |  |  |  |  | 2 |

[a] Hi-Sol solvents are marketed by Bronoco Sales of Ashland Oil & Refining Company.
[b] Available from Industrial Solvents Corp.
[c] Available from Amoco Chemical Company.

With respect to the chloromethylation reaction, the hydrocarbons preliminarily are admixed with water containing formaldehyde and HCl and HCl gas is passed through the mixture. The mixture is maintained at a temperature between about 70° C. and its boiling point and most appropriately between about 80° C. and 95° C. Generally, the reaction is conducted at atmospheric pressures for convenience. Low pressures such as are developed by the HCl off-gas absorption system are advantageous and help conserve HCl.

While tests have demonstrated that the presence of aqueous HCl is necessary to achieve a significant reaction, the amount of aqueous HCl present at the beginning of the reaction need not be great. Generally, about 10% of technical or reagent grade HCl (33% HCl) based on the weight of the alkylbenzenes is sufficient to assure good yields. The amount of aqueous HCl can be increased to 200% or more but no significant increase in yield obtains. Accordingly, in order to realize the greatest economy of equipment, the invention in a preferred embodiment contemplates a reaction mixture which contains from about 10% to about 100% and desirably from about 20% to about 50% by weight of aqueous HCl based upon the hydrocarbon starting material. It will be apparent that, as an alternative, an appropriate amount of water may be admixed with the alkylbenzenes and the first portion of the HCl gas introduced into the mixture will be absorbed to provide the aqueous HCl.

The formaldehyde present in the reaction mixture should be at least sufficient to provide the methylene groups necessary for the reaction. Generally, even if a reaction is contemplated wherein the mono- and dialkylbenzenes are monochloromethylated, the tri- and tetraalkylbenzene will be converted to bischloromethylated products. In such case, the formaldehyde present on a mole basis should be at least equal to about $X+2Y$ wherein X represents the number of moles of mono- and dialkylbenzenes and Y represents the number of moles of tri- and tetraalkylbenzenes. Similarly, if a reaction is contemplated wherein the emphasis will be on a bischloromethylated product, the formaldehyde present should be at least equal to $2X+2Y$ moles. Since all the hydrocarbons in the mixture will not be converted, the above guides should provide a sufficient excess of formaldehyde in the reaction mixture. While the economics of the process dictate that excess formaldehyde be kept to a minimum, larger amounts of formaldehyde in the reaction mixture do not materially affect the reaction adversely. Paraformaldehyde may be employed as the equivalent of formaldehyde observing the stoichiometric relationship discussed above.

After the reaction mixture has been formulated, it is heated to a temperature of at least about 70° C. and is subjected to sufficient agitation to insure intimate contact of the reactants. HCl gas is then sparged into the reaction mixture at a rate which after the total reaction will provide a stoichiometric excess of HCl. Generally, the HCl rate may be maintained constant during the reaction and should provide at least about 120% HCl.

The reaction generally will require from as little as about 2 hours and may be conducted for as long as 12 hours or longer depending upon whether higher proportions of bis-(chloromethyl) alkylbenzenes are desired. In general, at the end of about 3 hours, the weight of the monochloromethylated material will be at least about 60% and the bischloromethylated material will be at least about 10% by weight based on the weight of the hydrocarbon starting material. Often the weight of the monochloromethylated material will be in excess of 70% based on the weight of the hydrocarbon starting material. Longer reaction times will increase the amount of bischloromethylated product but will not materially increase the amount of monochloromethylated product. Thus, for example, a 6-hour reaction generally will provide from about 65% to about 80% monochloromethylated material and from about 15% to about 20% of the bischloromethylated material. The relative percentage of the products will, of course, vary somewhat depending upon the precise composition of the starting materials employed. Generally, reaction times of from about 2 to about 12 hours can be effectively employed, preferably from about 3 to about 6 hours.

At the end of the reaction, the water layer, which will contain HCl as well as unreacted formaldehyde, is separated from the hydrocarbon layer. The hydrocarbon layer most appropriately is washed to remove residual HCl and the like and then is subjected to distillation. Initial distillation at 50 mm. Hg and 130° C. will remove remaining water and unreacted hydrocarbon. Subsequent distillation at 20 mm. Hg will provide the monochloromethylated material at about 145° C., an intermediate material at a temperature between 145° C. and 175° C., and a bischloromethylated material at 175° C. The precise distillation conditions employed may be varied widely and are within the skill of the operator.

Most desirably, the distillation of the hydrocarbon material is carried out in the presence of traces of a basic material such as potassium carbonate or the like.

The aqueous layer which was removed from the reaction mixture most appropriately can be admixed with additional hydrocarbon starting material and heated to 90° to 95° C. to utilize the residual HCl and formaldehyde. After a short period of time of about ½ hour, the excess water can be withdrawn and additional formaldehyde added to the mixture to provide a reaction mixture for the next run.

Employing the reaction times indicated above, substantially no HCl will be given off the reaction mixture for at least the first 1½ hours. Accordingly, when operating several batch reaction mixtures, the 1½ hour period can be used to charge a second batch; and the off-gas from the latter part of the first reaction can be charged to the second reactor. Such procedure substantially eliminates HCl disposal problems. The minor amount of HCl given off readily can be absorbed in standard absorption equipment.

The following examples are included in order more fully to demonstrate the practice of this invention. These examples are presented for illustration purposes only and in no way are intended to limit the scope of the invention. All parts and percentages are by weight unless otherwise designated.

*Example I*

140 pounds of a mixture containing monoalkylbenzenes and polyalkylbenzenes as specified in Table I for the product sold under the trade name Hi-Sol 98F was mixed with 114 pounds of an aqueous HCl-formaldehyde solution recovered from a prior chloromethylation reaction analyzing 30.0 weight percent HCl and 2.92 weight percent formaldehyde were mixed at a temperature of about 85 to 95° C. for about ½ hour. Excess HCl-water layer was removed to keep the weight of the aqueous HCl solution in the range of about 80–82 pounds. 42.0 pounds of paraformaldehyde were mixed with the aqueous HCl-formaldehyde solution and oil to provide an adequate quantity of formaldehyde for the chloromethylation reaction. Over a period of about 6 hours, 66.0 pounds of anhydrous HCl gas was bubbled through the reaction mixture. Very little HCl gas given off during the first half of the reaction. The amount of HCl gas given off during the last half of the reaction was larger and can be collected and passed to a second similar reaction mixture undergoing chloromethylation. At the end of the reaction period, the aqueous phase was separated from the organic phase, and about 115 pounds of the aqueous HCl layer being separated for use in a second chloromethylation reaction. The aqueous phase so separated contained 28.7 weight percent HCl and 3.99 weight percent of formaldehyde. The separated organic layer was washed twice with water, the water being discarded. The crude chloromethylated product obtained after washing weighed about 195 pounds. The oil layer was subjected to fractional distillation after admixture with a small quantity of potassium carbonate (0.44 pound). A series of cuts were taken during the fractional distillation as follows: cut No. 1—boiling to 130° C. at 50 mm. Hg; cut No. 2—boiling from 130 to 165° C. at 50 mm. Hg; cut No. 3—boiling to 145° C. at 20 mm. Hg; cut No. 4—boiling from 145–175° C. at 20 mm. Hg; and cut No. 5—boiling from 175 to about 200° C. at 20 mm. Hg. The residue was discarded. Cut No. 1 weighed about 28.1 pounds, containing 1.1 pounds of water and 27.0 pounds of oil having 4.91 weight percent chlorine. After separation of the water, the oil phase recovered can be used as a recycle, or in admixture with fresh material in a subsequent chloromethylation reaction. Cut No. 2 weighed about 106 pounds and contained 19.72 weight percent chlorine. This represents primarily monochloromethylalkylbenzene. Cut No. 3 weighed about 9.1 pounds and contained 19.59 weight percent chlorine. Cut No. 4 weighed about 3.8 pounds and contained 23.43 weight percent chlorine. The 5th cut weighed about 38 pounds and contained 31.20 weight percent chlorine. This cut was primarily bis(chloromethyl)alkylbenzene. The residue weighed about 6.1 pounds. About 4 pounds of material was unaccounted for and probably was lost during transfer between storage and distillation, etc. The monochloromethylalkylbenzenes collected had a specific gravity of about 1.04. The bis(chloromethyl)alkylbenzene had a specific gravity of about 1.1 at 80° C., the product becoming fluid at about 40 to about 80° C. The percent conversion to chloromethylalkylbenzenes based on the quantity of formaldehyde reacted was about 68%.

*Example II*

To establish the improved reaction rate of monoalkylbenzene in the presence of polyalkylbenzene, a number of comparative chloromethylation reactions were run wherein mesitylene, n-propyl benzene, the mixture employed in Example I and the unreacted material recovered in the first cut in the fractional distillation process from Example I, were employed. The relative proportions of reagents and the conditions used in Example I were employed in these comparative runs. The amount of hydrogen chloride gas charge was measured and the unreacted hydrogen chloride gas was collected and measured both for the first half and the second half of the reaction periods in each run. The data from these runs is set forth in Table II.

TABLE II

*Unreacted HCl during chloromethylation reactions*

| Hydrocarbon | Reaction, hrs. | HCl Gas Charged, g. | Unreacted g. | Unreacted Percent |
|---|---|---|---|---|
| Mesitylene | 0 to 1.5 | 27 | 0.4 | 1.5 |
|  | 1.5 to 3 | 17 | 8.5 | 50 |
| Total |  | 44 | 8.9 | 20 |
| n-Propylbenzene | 0 to 1.5 | 22 | 26 | 118 |
|  | 1.5 to 3 | 22 | 22 | 100 |
| Total |  | 44 | 48 | 109 |
| Hi-Sol 98F | 0 to 1.5 | 22.5 | 1.3 | 5.7 |
|  | 1.5 to 3 | 25 | 17.5 | 70 |
| Total |  | 47.5 | 18.8 | 40 |
| Unreacted 98F | 0 to 1.5 | 29 | 18.6 | 64 |
|  | 1.5 to 3 | 15 | 21 | 140 |
| Total |  | 44 | 39.6 | 90 |

The above data show that the monoalkylbenzenes in Hi-Sol 98F were chloromethylated to a greater extent than would have been predicted on the basis of the chloromethylation of n-propylbenzene. The comparable chloromethylations gave 25% by weight of unreacted material for Hi-Sol 98F and 85% by weight of unreacted material for n-propylbenzene. Since Hi-Sol 98F contains 60% monoalkylbenzenes, predominantly n-propylbenzene, the predicted unreacted fraction would be 60 × 85%, or 51%. Therefore, the chloromethylation of the Hi-Sol 98F mixture unexpectedly doubles (51/25) the chloromethylation of monoalkylbenzenes.

*Examples III through XIV*

A series of runs were made utilizing the process of the present invention. In these runs, 100 grams of the mixed alkylbenzenes sold under the trade name Hi-Sol 98F were used, and the temperatures during the chloromethylation reaction ranged between about 85° C. and 95° C. at atmospheric pressure. At the end of the reaction period, the aqueous phase was separated from the oil phase and the latter washed with water prior to distillation. 0.2 g. of $K_2CO_3$ was added to the oil layer prior to fractionation. In Examples VII through X, the aqueous phase was analyzed for HCl and HCHO content. The data are set forth in Table IV. In view of the high HCl content, this can be used in subsequent chloromethylation reactions assuming, of course, additional formaldehyde is provided.

In Example VIII, the off-gas, HCl, was measured during the first 1½ hours of the reaction period and during the last 1½ hours of the reaction period. In the first half about 22.5 g. of HCl gas was added and about 1.3 g. collected as off-gas. This represents about 5.7% unreacted. In the last half about 25 g. of HCl gas was added and about 17.5 g. collected. This represents about 70% unreacted. The HCl gas from the last half of the reaction period can be collected and passed to the first half of another chloromethylation reaction.

TABLE III

| Ex. No. | Time, hours | Paraformaldehyde, g. | Aqueous HCl ml.[a] | Gas HCl, g. | Forerun, percent Phy | Forerun, percent Cl | 1st Cut, percent Phy | 1st Cut, percent Cl | Mono, percent Phy | Mono, percent Cl | Intermed., percent Phy | Intermed., percent Cl | Bis, percent Phy | Bis, percent Cl | Total percent Phy | Residue percent Phy | Paraformaldehyde conversion, percent Theory |
|---|---|---|---|---|---|---|---|---|---|---|---|---|---|---|---|---|---|
| III[d] | 6 | 30 | 50R | 54 | 15.8 | ----- | 11.1 | 4.1 | 74.6 | 21.3 | 26.4 | 29.3 | ----- | ----- | 130 | 3.4 | 68 |
| IV | 6 | 30 | 50T | 44 | 14.0 | 3.7 | 18.4 | 2.9 | 67.9 | 20.6 | 8.1 | 23.4 | 16.6 | 30.0 | 125 | 3.0 | 62 |
| V | 6 | 30 | 50T | 44 | 6.7 | 1.0 | 22.1 | 2.2 | 71.5 | 21.0 | 7.5 | 23.4 | 17.0 | 31.6 | 125 | 3.2 | 64 |
| VI | 6 | 30 | 50T | 50 | 4.0 | 0.57 | 25.8 | 2.6 | 61.4 | 20.5 | 18.7 | 22.6 | 18.9 | 31.1 | 129 | 1.4 | 67 |
| VII | 3 | 30 | 50T | 47 | ----- | ----- | 28.7 | 2.8 | 75.0 | 21.2 | 7.1 | 28.4 | 13.6 | 31.9 | 125 | 4.7 | 63 |
| VIII | 3 | 30 | 50T | 47 | ----- | ----- | 28.3 | 2.7 | 72.4 | 21.2 | 4.7 | 24.0 | 15.5 | 31.4 | 121 | 3.8 | 63 |
| IX | 1.5 | 30 | 50T | 47 | ----- | ----- | 45.7 | 2.0 | 66.3 | 20.4 | 3.6 | 26.0 | 10.0 | 30.6 | 126 | 1.8 | 53 |
| X | 3 | 22.5 | 50T | 33 | ----- | ----- | 38.9 | 1.9 | 69.9 | 20.5 | 3.7 | 26.9 | 9.9 | 30.4 | 123 | 2.4 | 74 |
| XI | 3 | 30 | 25T | 47 | ----- | ----- | 24.0 | 2.6 | 80.4 | 20.5 | 6.3 | 23.7 | 15.4 | 31.4 | 126 | 1.8 | 66 |
| XII | 3 | 30 | 200T | 44 | ----- | ----- | 21.5 | 4.7 | 76.5 | 21.1 | 8.8 | 23.9 | 20.1 | 31.4 | 125 | 3.9 | 70 |
| XIII | 3 | 30 | 12.5R | 45 | ----- | ----- | 30.7 | 2.8 | 78.2 | 20.7 | 3.3 | 24.0 | 10.6 | 30.4 | 123 | 2.2 | 60 |
| XIV | 12 | 30 | 50T | 44 | 9.8 | 3.3 | 17.1 | 2.6 | 64.2 | 20.7 | 7.6 | 24.1 | 16.1 | 30.6 | 115 | 8.5 | 67 |

[a] Concentrated hydrochloric acid:
R—reagent (38%)
T—technical (33%)

[b] Distilled products (8″ or 12″ Vigreux column):
Forerun, 500 mm.—collected during removal of water
1st cut, 50 mm.—to 130° C.
Mono, 50 mm.—to 165° C. for Ex. III–VI
Mono, 20 mm.—to 145° C. for Ex. VII–XIV
Intermediate, 20 mm.—to 180° C. for Ex. III
Intermediate, 20 mm.—to 175° C. for Ex. IV–XIV
Bis, 20 mm. or less—to ca. 200° C.

[c] Percent physical is the weight percent yield, or the physical yield based on the weight of Hi-Sol 98F used.

[d] Temperature—3 hours at 70° C., 2½ hours to 103° C., finally to 108° C. to distill 38 ml. of water and 31 ml. (31 g.) of oil at the end of the reaction.

TABLE IV

| | Aqueous phase analysis, percent | |
|---|---|---|
| | HCl | HCHO |
| Ex. VII | 30.7 | 4.6 |
| Ex. VIII | 28.0 | 5.9 |
| Ex. IX | 26.4 | 9.8 |
| Ex. X | 28.0 | 6.0 |

While this invention has been described and exemplified in terms of its perferred embodiments, those skilled in the art will appreciate that changes and modifications can be made without departing from the spirit and scope of the invention.

I claim:

1. In a method for the chloromethylation of a monoalkylbenzene by reaction thereof with formaldehyde and HCl, the improvement which comprises concomitantly chloromethylating a polyalkylbenzene in admixture with said monoalkylbenzene, said mixture undergoing chloromethylation being characterized by (a) containing essentially alkylbenzenes having from 8 to 11 carbon atoms in their molecules; (b) containing from about 70% to about 20% by weight monoalkylbenzene; (c) containing from about 30% to about 80% by weight of a polyalkylbenzene selected from the group consisting of di-, tri-, and tetraalkylbenzene; and (d) containing at least about 10% by weight of a polyalkylbenzene having more than 2 alkyl groups.

2. In a method for the chloromethylation of a monoalkylbenzene by reaction thereof with aqueous formaldehyde and HCl wherein the monoalkylbenzene is first mixed with aqueous formaldehyde and HCl and HCl gas is bubbled through the mixture, the improvement which comprises concomitantly chloromethylating a polyalkylbenzene in admixture with said monoalkylbenzene, said mixture undergoing chloromethylation being characterized by (a) containing essentially alkylbenzenes having from 8 to 11 carbon atoms in their molecules; (b) containing from about 70% to about 20% by weight monoalkylbenzene; (c) containing from about 30% to about 80% by weight of a polyalkylbenzene selected from the group consisting of di-, tri-, and tetraalkylbenzene; and (d) containing at least about 10% by weight of a polyalkylbenzene having more than 2 alkyl groups.

3. The method according to claim 2 wherein the reaction mixture is maintained at a temperature in the range between about 70° C. and its boiling point at atmospheric pressure, and the reaction continued for a period of about 2 to about 12 hours whereby a mixture is produced containing monochloromethylalkylbenzenes and bis(chloromethyl)alkylbenzenes capable of separation by distillation.

4. An improved method for the chloromethylation of a monoalkylbenzene which comprises forming a reaction mixture containing:
(I) A mixture containing essentially only alkylbenzenes having from 8 to 11 carbon atoms in the molecule and characterized by (a) containing from about 70% to about 20% by weight monoalkylbenzene; (b) containing from about 30% to about 80% by weight of a polyalkylbenzene selected from the group consisting of di-, tri-, and tetraalkylbenzene; and (c) containing at least about 10% by weight of a polyalkylbenzene having more than 2 alkyl groups;
(II) Formaldehyde; and
(III) Aqueous HCl;
and passing HCl gas through the mixture at a temperature of at least about 70° C. to provide a mixture containing monochloromethylalkylbenzene and bis(chloromethyl)alkylbenzenes, and separating the monochloromethylalkylbenzenes from the bis(chloromethyl)alkylbenzenes.

5. An improved method for the chloromethylation of a monoalkylbenzene which comprises forming a reaction mixture containing:
(I) A mixture containing essentially only alkylbenzenes having from 8 to 11 carbon atoms in the molecule and characterized by (a) containing from about 70% to about 20% by weight monoalkylbenzene; (b) containing from about 30% to about 80% by weight of a polyalkylbenzene selected from the group consisting of di-, tri-, and tetraalkylbenzene; and (c) containing at least about 10% by weight of a polyalkylbenzene having more than 2 alkyl groups;
(II) Formaldehyde; and
(III) Aqueous HCl;
maintaining said mixture at a temperature in the range between about 70° C. and its boiling point at atmospheric pressure while bubbling HCl gas therethrough for a period of about 2 to about 12 hours to provide a mixture containing monochloromethylalkylbenzenes and bis(chloromethyl)alkylbenzenes, and separating the monochloromethylalkylbenzenes from the bis(chloromethyl)alkylbenzenes by distillation.

6. A method according to claim 5 wherein formaldehyde is present in the chloromethylation reaction mixture in an amount sufficient to provide a molar proportion of at least $X + 2Y$ wherein X represents the number of moles of mono- and di-alkylbenzenes present and Y represents the number of moles of tri- and tetraalkylbenzenes present.

7. A method according to claim 5 wherein I consists of a mixture containing by weight, from about 50 to about 60% of monoalkylbenzene and from about 50 to about 40% of polyalkylbenzenes.

8. A method according to claim 5 wherein I contains, by weight, 3% ethylbenzene, 5% cumene, 39% n-propylbenzene, 11% mesitylene, 9% isobutylbenzene, 29% paracymene and about 3% n-btuylbenzene.

9. An improved method for the chloromethylation of a monoalkylbenzene which comprises forming a reaction mixture containing:
(I) A mixture containing essentially only alkylbenzenes having from 8 to 11 carbon atoms in the molecule and characterized by (a) containing from about 70% to about 20% by weight monoalkylbenzene; (b) containing from about 30% to about 80% by weight of polyalkylbenzene selected from the group consisting of di-, tri-, and tetraalkylbenzene; and (c) containing at least about 10% by weight of a polyalkylbenzene having more than 2 alkyl groups;
(II) Formaldehyde; and
(III) Aqueous HCl;

maintaining said reaction mixture at a temperature in the range between about 70° C. and its boiling point at atmospheric pressure, bubbling HCl gas through said mixture for a period of about 6 hours to provide a mixture containing monochloromethylalkylbenzenes and bis(chloromethyl)alkylbenzenes, recovering unreacted HCl gas during the last 3 hours of said reaction period and passing the same to a second chloromethylation reaction mixture of the character hereinbefore defined, separating the aqueous phase from the organic phase of the mixture containing monochloromethylalkylbenzenes and bis(chloromethyl)alkylbenzenes, and separating the monochloromethylalkylbenzenes from the bis(chloromethyl)alkylbenzenes by distillation.

10. A method according to claim 9 wherein the aqueous phase separated from the organic phase is passed to the second chloromethylation reaction mixture to provide at least a portion of the aqueous formaldehyde and HCl required for said second chloromethylation.

References Cited by the Examiner

UNITED STATES PATENTS 2,469,334   5/49   Hartough et al. _____ 260—651

OTHER REFERENCES

Sachanen: "Chemical Constituents of Petroleum," pp. 259–265 (1945).

LEON ZITVER, *Primary Examiner.*

ALPHONSO D. SULLIVAN, *Examiner.*